US011629459B2

(12) United States Patent
Hietaniemi et al.

(10) Patent No.: US 11,629,459 B2
(45) Date of Patent: Apr. 18, 2023

(54) METHOD FOR TREATING AQUEOUS FEED BY DISSOLVED GAS FLOTATION

(71) Applicant: Kemira Oyj, Helsinki (FI)

(72) Inventors: Matti Hietaniemi, Espoo (FI); Jyri Välimäki, Nokia (FI); Joonas Likander, Espoo (FI); Rosa Carceller, Espoo (FI)

(73) Assignee: Kemira Oyj, Kelsinki (FI)

( * ) Notice: Subject to any disclaimer, the term of this patent is extended or adjusted under 35 U.S.C. 154(b) by 411 days.

(21) Appl. No.: 16/766,718

(22) PCT Filed: Dec. 14, 2018

(86) PCT No.: PCT/FI2018/050922
§ 371 (c)(1),
(2) Date: May 25, 2020

(87) PCT Pub. No.: WO2019/115882
PCT Pub. Date: Jun. 20, 2019

(65) Prior Publication Data
US 2020/0399828 A1 Dec. 24, 2020

(30) Foreign Application Priority Data

Dec. 15, 2017 (FI) ..................... 20176122

(51) Int. Cl.
*D21C 5/00* (2006.01)
*D21C 5/02* (2006.01)
*D21B 1/32* (2006.01)

(52) U.S. Cl.
CPC ............. *D21C 5/027* (2013.01); *D21B 1/327* (2013.01)

(58) Field of Classification Search
CPC ................................ D21H 21/10; D21C 9/18
USPC ................................. 210/709, 96.1
See application file for complete search history.

(56) References Cited

U.S. PATENT DOCUMENTS

| 5,454,955 A | 10/1995 | Albrecht et al. |
| 6,019,904 A | 2/2000 | Wong Shing et al. |

| 2001/0052501 A1 | 12/2001 | Sparapany et al. |
| 2007/0032677 A1 | 2/2007 | Herth et al. |
| 2009/0255876 A1 | 10/2009 | Dunbar |

FOREIGN PATENT DOCUMENTS

| CA | 2194295 A | 11/1996 |
| EP | 0522334 A1 | 1/1993 |
| EP | 3246466 A1 | 11/2017 |
| WO | 9302966 A1 | 2/1993 |
| WO | 0202662 A1 | 1/2002 |
| WO | 2015155330 A1 | 10/2015 |
| WO | 2016030407 A1 | 3/2016 |
| WO | 2017162920 A1 | 9/2017 |

OTHER PUBLICATIONS

Bolto, B. et al. Organic polyelectrolytes in water treatment, In: Water Research Elsevier Ltd., Apr. 25, 2007, vol. 41, 2301-2324, chapters 3.3, 3.3.1, 3.3.3, 3.4.1, 5.1.3; tables 1, 2.

Finnish Patent and Registration Office, Search report of FI20176122, dated Jun. 15, 2018, 2 pages.

Per Stenius, Forest Products Chemistry, Macromolecular Surface and Colloid Chemistry (pp. 172-173, China Light Industry Press Ltd., Sep. 30, 2017).

Search report issued in corresponding Chinese application No. 201880076712.8, completed Oct. 25, 2022, 2 pages.

*Primary Examiner* — Jacob T Minskey
(74) *Attorney, Agent, or Firm* — Meunier Carlin & Curfman LLC

(57) ABSTRACT

A method is disclosed for treating aqueous feed by dissolved gas flotation. The aqueous feed originates from industrial processing of fibrous material, where the aqueous feed includes an aqueous phase and solid particulate material suspended in the aqueous phase. The method includes bringing a flocculant in contact with the aqueous feed, flocculating suspended solid particulate material into flocs and contacting formed flocs with gas bubbles and inducing their flotation in a flotation basin. The flocculant includes a polymer composition having a charge density of at the most 1.7 meq/g dry and the polymer composition includes a cationic synthetic first polymer having a charge density at least 1.0 meq/g dry at pH 2.8, and at least one second polymer obtained by polymerization of (meth)acrylamide, the second polymer being polymerized in presence of the cationic first polymer, where the first polymer has a higher charge density than the second polymer.

18 Claims, No Drawings

METHOD FOR TREATING AQUEOUS FEED BY DISSOLVED GAS FLOTATION

PRIORITY

This application is a U.S. national application of the international application number PCT/FI2018/050922 filed on Dec. 14, 2018 and claiming priority of FI national application 20176122 filed on Dec. 15, 2017 the contents of all of which are incorporated herein by reference.

The present invention relates to a method for treating aqueous feed from manufacture of pulp, paper, board, recycled fibre pulp or the like by dissolved gas flotation, especially a dissolved air flotation (DAF), according to the preamble of the enclosed independent claim.

Dissolved gas flotation is used to clarify various aqueous feeds from pulp, paper and board making processes. Flocculants may be added to the aqueous feed to be treated in order to flocculate the suspended solid particulate material present in the feed before the feed is introduced into a flotation basin. In typical dissolved gas flotation process dispersion water containing dissolved gas is introduced together with aqueous feed into the flotation basin. When the dispersion water enters the flotation basin, the dissolved gas is released in form of small bubbles. The flocs are contacted with the small air bubbles, whereby the air bubbles are attached to the formed flocs. The bubbles cause the flocs to float on the surface, where is formed a floating layer or floating islands of surface sludge, which can be removed from the surface, e.g. with a scraper or through an overflow outlet. Clarified water is usually removed from the lower part of the basin. Typically, a part of the clarified water is separated and used as dispersion water, after gas has been dissolved into it.

Conventionally high-molecular weight polyacrylamide flocculants have been used to flocculate the suspended solid particular material in the feed before its entry to the flotation basin. Due to an increased environmental awareness and regulations, industrial processes, such as pulp and papermaking processes, have become more and more closed, which means that they use less fresh water. This results in increased conductivity or total ionic strength, i.e. salt concentration, in the process waters. At the same time the use of recycled fibre has increased as a fibre source in the papermaking, which provides a substantial load of dissolved and colloidal substances, so-called anionic trash, to the process waters. Both the elevated conductivity and the elevated load of dissolved and colloidal substances tend to interfere with the performance of conventional flocculant polymers. Consequently, there is a need for new effective method that can be used for removal of suspended solid material in a dissolved gas flotation (DAF) process.

An object of this invention is to minimise or even eliminate the disadvantages existing in the prior art.

An object is also to provide a method, which is efficient also in treating aqueous feed from an industrial processing of fibrous material of cellulosic origin, such as manufacture of pulp, paper, board, recycled fibre pulp or the like, where the aqueous feed has elevated conductivity and/or elevated cationic demand that reflects the amount of dissolved and colloidal substances in the aqueous feed.

A further object of this invention is to provide a method which provides stable long-lasting flocs.

A further object of this invention is to provide a method which provides clarified water with low concentration of suspended solid particulate material and low turbidity.

These objects are attained with the invention having the characteristics presented below in the characterising part of the independent claim. Some preferable embodiments are disclosed in the dependent claims.

The embodiments mentioned in this text relate, where applicable, to all aspects of the invention, even if this is not always separately mentioned.

In a typical method according to the present invention for treating aqueous feed by dissolved gas flotation, especially by dissolved air flotation (DAF), the aqueous feed originating from an industrial processing of fibrous material of cellulosic origin, such as manufacture of pulp, paper, board, recycled fibre pulp or the like, where the aqueous feed comprises an aqueous phase and solid particulate material suspended in the aqueous phase, and the method comprises bringing a flocculant in contact with the aqueous feed and flocculating suspended solid particulate material into flocs through interaction of flocculant and suspended solid particulate material, contacting formed flocs with gas bubbles and inducing their flotation in a flotation basin, wherein the flocculant, which is used for flocculating suspended solid particulate material, comprises a polymer composition having a charge density of at the most 1.7 meq/g dry, preferably at the most 1.5 meq/g dry, more preferably at the most 1.1 meq/g dry, the polymer composition comprising a cationic synthetic first polymer, which has a charge density at least 1.0 meq/g dry at pH 2.8, at least one second polymer, which is a polymer obtained by polymerisation of (meth)acrylamide, the second polymer being polymerised in the presence of the cationic first polymer, wherein the first polymer has a higher charge density than the second polymer.

Now it has been surprisingly found out that in a dissolved gas flotation unexpected improvements can be obtained in treatment of aqueous feed when a flocculant comprising a specific polymer composition is used for flocculating suspended solid particulate material. The flocculant comprising the specific polymer composition successfully interacts and flocculates the suspended solid particulate material, including possibly at least a part of anionic colloidal particles, and produces flocs which are structurally stable and long-lived. It is assumed, without wishing to be bound by a theory that the first polymer of the polymer composition, having a higher charge density that the second polymer, interacts with the anionic colloidal particles and/or anionic dissolved substances, thereby anchoring the polymer composition comprising physically entangled polymer chains of the first and second polymer to these substances. Elevated conductivity and/or elevated cationic demand of the aqueous feed usually exert a compressing force on the cationically charged polymer chains, but as the cationic charge of the polymer composition, and especially its second polymer, is only modest, the physically entangled polymer chains are less compressed, and they remain more extended. This may enable an efficient flocculation of the suspended solid particulate material with the second polymer of the polymer composition. In this manner the flocculation ability of the polymer composition, including extension of the entangled polymer chains and the individual polymers' capacity to form ionic bonds and take part of electrostatic interactions, is not exhausted by elevated cationic demand and/or conductivity, but it is preserved for the suspended solid particulate material and is capable of forming strong flocs.

According to the present invention the use of the flocculant comprising the specific polymer composition may provide enhanced floc size, floc stability and/or sludge cake density. Especially, improved flock stability is an advantageous feature in dissolved gas flotation, where it may take several minutes to transport the formed flocks through the flotation basin to the surface. Once the flocs reach the surface, they form a surface sludge that should not dissolve or disintegrate back to the aqueous phase of the flotation basin. Higher surface sludge density, i.e. lower water content in the surface sludge, may improve the scraping results of the surface sludge.

In the present context the term "solid particulate material" comprises different organic and inorganic solid particles present in the aqueous feed. The aqueous feed may contain, for example, fibre material, such as long fibre material and/or short fibre material, and/or inorganic mineral particles. The fibre material is cellulosic fibre material originating from wood or non-wood sources, preferably from wood sources. Long fibre material denotes the fibre fraction, which is retained on 100 mesh metal wire screen, and short fibre material or fibre fragments denotes the fibre fraction, which permeates 100 mesh metal wire screen. While long fibre material is easier to flocculate, a high proportion of long fibre material is not required. An efficient flocculation is obtainable by the specific polymer composition even when the aqueous feed comprises long fibre material less than 20 weight-%, even less than 10 weight-%, calculated from the suspended solids content of the aqueous feed. Further, the aqueous feed may comprise inorganic mineral particles, and it may have an ash content value in the range of 20-90%, preferably 20-85%, calculated from solids. Ash content value is determined by using Standard ISO 1762, temperature 525° C. The inorganic mineral particles in the aqueous feed as well as in the surface sludge typically originate from fillers and coating materials used in paper and board making. The solid particulate material may further include colloidal particles, which have at least one dimension between 1 nm and 1 μm, as well as microflocs, obtained by interaction between dissolved material and coagulant(s). In some embodiments, the solids content of the aqueous feed may be in the range 50-5000 mg/l, preferably 150-4000 mg/l.

In the present context the term "floc stability" means that the floc size is maintained and/or that floc size reduction is inhibited as a function of time. For example, the change in floc size between 1 min and 5 min after the addition of the flocculant may be less than 20%. The floc size can be measured for example by a focused beam reflectance measurement (FBRM) using DDJ type mixer at 500 rpm. As noted, floc stability is especially beneficial in dissolved gas flotation where the passing/retention time of the flocs may be several minutes, sometimes up to 6 minutes or more. The formed flocs preferably maintain their size when they advance through the flotation basin onto its surface. Maintenance of an appropriate floc size throughout the flotation process enhances the flotation thereby facilitating increased feed capacity and shortened passing time. The formed flocs preferably also withstand mechanical forces, for example during the removal of the floating layer or islands of flocs. The use of the described polymer composition provides unexpected improvements especially in floc stability.

Increased floc density, which can be measured by the thickness of the surface sludge after flocs have risen to the surface, may provide a high surface sludge consistency.

In the present context the term "anionic trash" is understood as anionic dissolved or colloidal material present in the aqueous phase of the aqueous feed. Anionic trash may comprise various fatty and resin acid salts, hemicelluloses and their oxidation by-products, lignin derivatives, and/or anionic additives from broke or recycled paper, such as dispersants and/or anionic latex particles. The amount of anionic dissolved and colloidal material, i.e. anionic trash, in the aqueous feed is reflected by the cationic demand of the aqueous feed, measured by Mütek titration. The present invention is especially suitable for aqueous feeds, which have an elevated cationic demand. The aqueous feed may have a cationic demand value in the range of 20-3000 μeq/l, preferably 200-3000 μeq/l, more preferably 100-2000 μeq/l, even more preferably 400-1500 μeq/l, sometimes even more preferably 500-1500 μeq/l, measured by Mütek titration.

The aqueous feed may be obtained from any industrial process, where fibrous material, such as fibres, of cellulosic origin are treated or processed. Typical examples of such processes are manufacture of pulp, paper, board or tissue, or various processes where recycled fibre materials are processed, such as repulping or deinking. The aqueous feed to be treated by the present method may comprise circulating process water from such industrial process, or an effluent i.e. wastewater, from such industrial process. The aqueous feed from industrial processing of fibre material of cellulosic origin may comprise suspended solid particulate material, which preferably comprises inorganic mineral particles, cellulosic fibres and/or fibrils, and optionally also anionic trash, suspended in an aqueous phase. The aqueous feed entering into the flotation basin may comprise suspended solid particulate material in total amount of less than 6000 mg/l, preferably 50-5000 mg/l, more preferably 150-4000 mg/l.

According to one embodiment the dissolved gas flotation comprises at least the following steps:

(a) obtaining dispersion water by dissolving compressed gas in dispersion water, (b) obtaining the aqueous feed from an industrial processing of fibre material of cellulosic origin, wherein the aqueous feed comprises an aqueous phase and solid particulate material, such as fibres and/or fibre fragments suspended in the aqueous phase, (c) introducing a flocculant to the aqueous feed and/or dispersion water, (d) flocculating suspended solid particulate material into flocs through interaction of flocculant and suspended solid particulate material, (e) introducing the aqueous feed and dispersion water into a flotation basin, and decreasing the pressure for the dissolved gas in the dispersion water, whereby gas is released in form of gas bubbles, (f) allowing the gas bubbles to interact with the flocs and induce their flotation, thereby forming surface sludge on the surface or top of clarified water, (g) separating at least part of the formed surface sludge from clarified water by at least partial removal of the surface sludge from the basin, and (h) removing clarified water from the basin and preferably using a part of the clarified water for obtaining dispersion water in step (a).

In dissolved gas flotation dispersion water may be obtained by dissolving compressed gas, preferably air, into water. When dispersion water is introduced into a flotation basin, the pressure is suddenly decreased for the dissolved gas in the dispersion water, whereby the dissolved gas is released from dispersion water in form of gas bubbles, Dispersion water may be, for example, fed to the flotation basin through a pressure drop device, such as pressure drop nozzles or the like. According to one embodiment the flow volume of dispersion water is about 5-10 vol-% of the total feed volume entering the flotation basin of the dissolved gas flotation.

The aqueous feed may be introduced to the flotation basin simultaneously with the dispersion water, either simultaneously and separately, or simultaneously as one feed. In the former case, the flotation basin has separate feed connections for aqueous feed and for dispersion water, and in latter case aqueous feed and dispersion water meet, preferably immediately, before the flotation basin and are introduced into the flotation basin as one feed through a single feed connection.

According to one embodiment of the invention gas is dissolved in the aqueous feed, which thus functions also as dispersion water. In this embodiment the flocculant is preferably introduced to the aqueous feed before dissolving of gas.

The flocculant, which comprises the polymer composition as defined above and elsewhere in this text, may be introduced to the aqueous feed prior to the entry of the feed to the flotation basin through the feed connection. Alternatively, the flocculant is introduced to the dispersion water or both to the aqueous feed and dispersion water prior to their entry to the flotation basin. When the flocculant is introduced to the aqueous feed, it may be introduced or added to the aqueous feed 0 s-10 min, preferably 1 s-10 min, more preferably 1-60 s, before the entry of the aqueous feed to the flotation basin, whereby the flocs are formed in the aqueous feed. Alternatively, when the flocculant is added to the dispersion water, the flocs are mainly formed when the dispersion water and the aqueous feed come into contact with each other, for example immediately before or after their entry in the flotation basin.

Flocculant may be added to the aqueous feed and/or dispersion water continuously or periodically. In case flocculant is added to both the aqueous feed and the dispersion water, it is possible to add flocculant continuously in one flow and periodically to the other flow.

In general, the flocculant comprising the polymer composition flocculates the suspended solid material present in the aqueous feed, such as fibres, fibrils, inorganic particles and/or anionic trash, and provides an optimal floc size and stability for flotation. Thus, the flocs show good rising speed in the flotation basin and they are not easily broken, even under shear forces or mechanical stress, such as vigorous mixing, or during the removal of the surface sludge.

The polymer composition, which is used as flocculant, is usually diluted with or dissolved in water before the introduction to the aqueous feed and/or dispersion water.

In the flotation basin the gas bubbles are allowed to interact with the formed flocs and induce their flotation, thereby creating surface sludge on the surface or top of clarified water. The gas bubbles may be attached to the formed flocs and cause their flotation, i.e. their rise to the surface of the water phase present in the flotation basin. The water phase is simultaneously clarified. The floating flocs form surface sludge, which can be in form of a floating continuous or non-continuous layer of sludge or which may be in form of separate floating islands of sludge. Surface sludge can be discharged or removed from the upper part of the flotation basin, i.e. from the surface of the clarified aqueous liquid phase in the basin. A flow of clarified water, i.e. clarified filtrate, may be removed from the lower part of the flotation basin. Preferably a part of the clarified water is used for obtaining dispersion water. This means that a part of the clarified water is separated from the clarified water flow removed from the flotation basin; compressed gas is dissolved into the separated part of the clarified water and recirculated to the flotation basin as dispersion water.

The flocculant comprising the polymer composition provides flocs with good stability and floating ability, which improves the quality of the clarified water. According to one preferable embodiment the clarified water has >70%, preferably >80%, more preferably >90%, lower consistency of solid particulate material than the untreated aqueous feed entering the flotation basin. In addition, or alternatively, the clarified water may have a turbidity value of at most 2000 NTU, preferably <200 NTU, more preferably <50 NTU, for example 1-30 NTU, these turbidity values reflecting the polymer composition's effectiveness in decreasing also the colloidal substance content.

The conductivity of the aqueous feed entering the flotation basin may be in the range of 0.2-10 mS/cm, preferably 0.5-5.0 mS/cm, more preferably 1.0-4.0 mS/cm. The pH of the aqueous feed may be in the range of 4-9.5, preferably 4-8. The pH of the aqueous phase in the flotation basin may be in the range of 4-9.5, preferably 6.0-8.5, more preferably 7-8.5, even more preferably 7-8. The dissolved gas flotation process may be enhanced at acidic to neutral pH, but the flocculant consumption typically increases when the pH of the aqueous feed is over 8, and even further increase is usually noted when the pH raises over 9. However, the polymer composition, which is used in the present invention as a flocculant, is less vulnerable to elevated pH values and/or elevated conductivity. It has been observed that in comparison to conventional flocculants the increase in their consumption is modest at elevated pH and/or conductivity levels. Use of the present flocculant with the specific polymer composition thus enables formation of stable flocs even if the aqueous feed shows elevated levels of cationic demand and/or conductivity.

The polymer composition, which is suitable for use as a flocculant or as a part of the flocculant in the present method, comprises a cationic synthetic first polymer and a second polymer, which is a copolymer of (meth)acrylamide, the second polymer being polymerised in the presence of the cationic synthetic first polymer. Preferably, the polymerisation of the second polymer in the presence of the first polymer results in physical three-dimensional entanglement of the polymer chains of the first and second polymer. The first and second polymers become inseparable from each other without breaking of the polymer chains. It has been observed that the use of this kind of a polymer composition improves the floc formation and stability. The polymer composition provides also flocs having an optimal size, which means that they are large enough to be easily removed as surface sludge and small enough to be effectively raised through the flotation basin on the surface with the aid of attached air bubbles. It is assumed, without wishing to be bound by a theory, that the entanglement of the polymer chains of the first and the second polymer improve the structure of the polymers, especially in environment with high conductivity. The second polymer is able to remain outstretched and to form flocs of desired size.

The cationic synthetic first polymer may be obtained by radical polymerisation or condensation polymerisation. It may be linear or branched polymer.

The cationic synthetic first polymer may be prepared in a polymerisation reactor by polymerising suitable monomers. After the polymerisation reaction is completed the first cationic synthetic first polymer is preferably free of reactive polymerizable groups, such as double carbon-carbon bonds, in its structure. In a preferable embodiment the monomers of the second polymer, when polymerised in the presence of the first polymer, are reacting with each other and not forming covalent bonds with the first polymer, which is present as polymerisation matrix. Covalent bonds between the first and the second polymer are not requisite for providing the three-dimensional structure to the polymer composition, as the first and second polymer are physically entangled, and their polymer chains are inseparably intertwined or interlaced with each other.

The cationic synthetic first polymer is water-soluble, and preferably its structure is free of hydrophobic groups.

The cationic synthetic first polymer may have a weight average molecular weight in the range of 1000-500 000 g/mol. Preferably the cationic synthetic first polymer may have a weight average molecular weight MW<500 000 g/mol, preferably <100 000 g/mol, more preferably <50 000 g/mol, even more preferably <20 000 g/mol. According one embodiment of the invention the cationic synthetic first polymer may have a weight average molecular weight MW in the range of 1000-250 000 g/mol, preferably 1500-100 000 g/mol, more preferably 1500-50 000 g/mol, even more preferably 2000-20 000 g/mol. It has been observed that the cationic synthetic first polymer is more effective in interacting, for example, with anionic trash, when the weight average molecular weight of the first polymer is low. It is believed that when the first polymer has low molecular weight it is less affected by compressive forces caused by elevated conductivity and/or cationic demand, even when it has high cationic charge. The weight average molecular weight is determined by using size-exclusion chromatography (SEC), such as gel permeation chromatography, using procedures well known to a skilled person and based on calibration with polyethylene oxide standards.

The cationic synthetic first polymer typically may have a charge density of at least 1.0 meq/g dry, measured at pH 2.8. According to one preferable embodiment the cationic synthetic first polymer may have a charge density in the range of 1-12 meq/g dry, preferably 1-8 meq/g dry, more preferably 1.3-8 meq/g dry, even more preferably 5-7 meq/g dry, sometimes even 7-8 meq/g dry, measured at pH 2.8. In some embodiments the charge density may be 1.5-6.5 meq/g dry. The charge density of the cationic synthetic first polymer can be calculated theoretically when the amount of structural units carrying cationic charge in the polymerisation is known.

It has been unexpectedly observed that the low weight average molecular weight and a preferable moderate to high charge density of the cationic synthetic first polymer enhances its interaction with disturbing anionic substances that are present in the aqueous feed into the flotation basin. It is assumed without being bound by the theory that the cationic synthetic first polymer interacts with the small anionic particular material, such as anionic trash, while the second polymer is more active in floc formation.

According to one embodiment of the invention the cationic synthetic first polymer is selected from polyamines; homopolymers of cationic first monomer, obtained by radical polymerisation; copolymers of acrylamide and a cationic first monomer, obtained by radical polymerisation; or any combination thereof.

According to one embodiment the polymer composition may comprise cationic synthetic first polymer in amount of 0.5-35 weight-%, preferably 1-15 weigh-%, more preferably 2-9 weight-%, even more preferably 3-8 weight-%, calculated from the total dry polymeric material weight of the polymer composition.

The cationic synthetic first polymer may be polyamine, which is selected from copolymers of epichlorohydrin and dimethylamine, copolymers of epichlorohydrin, dimethylamine and ethylenediamine, and linear or cross-linked polyamidoamines. Such polymers may be obtained by condensation polymerisation. The weight average molecular weight of polyamine may be 1000-300 000 g/mol, preferably 1000-120 000 g/mol, preferably 2000-20 000 g/mol. The polyamines may possess high cationic charge.

According to one embodiment, the cationic synthetic first polymer may be obtained by radical polymerisation and be a homopolymer of cationic first monomer. The cationic first monomer can be selected from group consisting of 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino) ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino) propyl] trimethylammonium chloride (APTAC), [3-(methacryloylamino)propyl] trimethylammonium chloride (MAPTAC), and diallyldimethylammonium chloride (DADMAC). For those of the listed monomers containing a quaternary nitrogen in their structure, the cationicity is not pH dependent, which is a preferable feature. More preferably the cationic synthetic first monomer for the homopolymer is [3-(acryloylamino)propyl] trimethylammonium chloride (APTAC), [3-(methacryloylamino)propyl] trimethylammonium chloride (MAPTAC), or diallyldimethylammonium chloride (DADMAC), because these monomers provide cationic charge that is not pH dependent. They are also hydrolytically stable so that charge loss over time, due to hydrolysis, may be minimised. Even more preferably the cationic synthetic first monomer is diallyldimethylammonium chloride (DADMAC), because it is hydrolytically very stable. Preferably the polymer composition may comprise homopolymer in one of the amounts disclosed above.

According to another embodiment, the cationic synthetic first polymer may be obtained by radical polymerisation and be a copolymer of acrylamide and a cationic first monomer according to the list above, or it may be at least partially hydrolysed poly(N-vinylformamide). Preferably the cationic synthetic first polymer may be a copolymer of acrylamide and a cationic first monomer which is diallyldimethyhammonium chloride (DADMAC). Preferably the polymer composition may comprise the copolymer in one of the amounts disclosed above.

According to one preferable embodiment of the invention the cationic synthetic first polymer is selected from polyamines, preferably from copolymers of epichlorohydrin and dimethylamine, and copolymers of epichlorohydrin, dimethylamine and ethylenediamine; homopolymers of cationic first monomer, which is preferably diallyldimethyhammonium chloride (DADMAC), obtained by radical polymerisation; and copolymers of acrylamide and a cationic first monomer, which is preferably diallyldimethylammonium chloride (DADMAC), obtained by radical polymerisation.

According to one preferable embodiment of the invention the cationic synthetic first polymer is a linear polymer. When the cationic synthetic polymer is a linear polymer the solubility of the polymer composition may be improved.

According to one embodiment of the invention the second polymer is obtained by polymerisation of (meth)acrylamide and at least one second monomer, the amount of second monomer being 0.2-19 weight-%, preferably 0.5-12 weight- %, more preferably 1-6 weight-%, calculated from the total dry polymeric material weight of the polymer composition. According to another embodiment the second polymer is a copolymer of (meth)acrylamide and at least one second monomer, the amount of second monomer being 0.1-10 mol-%, preferably 0.3-6 mol-%, more preferably 0.5-3 mol-%, calculated from the total amount of the monomers of the polymer composition.

Preferably the second polymer is a cationic polymer, which means that the second monomers are cationic.

When the second polymer is cationic, the cationic second monomer may be selected from group comprising 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino) ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino) propyl] trimethylammonium chloride (APTAC), [3-(methacryloylamino)propyl] trimethylammonium chloride (MAPTAC), and diallyldimethylammonium chloride (DADMAC). For some of the listed monomers the cationicity changes as function of pH, for example they are more cationic at acidic pH but less cationic at neutral pH. Monomers that contain quaternary nitrogen in their structure provide cationic charge which is not pH dependent, and they are therefore preferred.

According to one preferable embodiment of the present invention the second polymer is a copolymer of acrylamide and [2-(acryloyloxy)ethyl] trimethyl-ammonium chloride (ADAM-Cl), [3-(acryloylamino)propyl] trimethylammonium chloride (APTAC), [3-(methacryloylamino)propyl] trimethylammonium chloride (MAPTAC), or combination thereof. These monomers can be polymerized into high molecular weight polymers, which is beneficial for the flocking efficiency of the polymer composition. Additionally, they provide cationic charge that is not dependent on pH. The amount of ADAM-Cl, APTAC and/or MAPTAC may be 0.1-10 mol-%, preferably 0.3-6 mol-%, more preferably 0.5-3 mol-%, calculated from the total amount of the monomers of the polymer composition.

According to one preferable embodiment of the present invention the second polymer is polymerised without addition of polyfunctional cross-linkers, such as methylene-bis-acrylamide, to the monomer mixture. In this way it is possible to improve the extension and/or reach of the polymer chains of the second polymer.

The second polymer is preferably polymerised in the presence of first polymer, which is polyamine.

The cationic synthetic first polymer has a higher charge density than the second polymer. The difference in cationicity of the cationic synthetic first polymer and the second polymer is at least 1 meq/g dry, preferably at least 2 meq/g dry, more preferably at least 3 meq/g dry, even more preferably at least 4 meq/g dry, sometimes even at least 5 meq/g dry. It is believed that the higher the difference in cationicity, the more pronounced are the interactions between the first polymer and anionic substances, and the extension of reach of the polymer chains of the second polymer, even at elevated cationic demand and/or conductivity. The highest differences in cationicity are obtainable by selecting polyamine and/or cationic homopolymer as the first polymer, and a second polymer comprising only acrylamide, or low amount of cationic monomers.

In one embodiment of the invention the cationic synthetic first polymer is a homopolymer, and the difference in cationicity of the cationic synthetic first polymer and the second polymer is at least 30 mol-%, preferably at least 90 mol-%, more preferably at least 94 mol-%. This may provide simultaneously an enhancement in flocculation as well as fixation, especially for sludges having cationic demand of at least 800 µeq/l.

Preferably the monomers used in polymerisation of the cationic synthetic first polymer and the second polymer are different from each other.

The polymer composition may have a total charge density of at the most 1.7 meq/g, preferably at the most 1.5 meq/g dry. According to one embodiment of the invention the total charge density of the polymer composition may be in the range of 0.1-1.7 meq/g dry, preferably 0.1-1.5 meq/g dry, more preferably 0.7-2.0 meq/g dry. The total charge density values can be measured by using Mütek at pH 7.0. Total charge density includes the It has been observed that when the polymer composition has total charge density <1.7 meq/g dry, it is providing an excellent performance in floc formation and gives a clarified filtrate of good quality. In general, it has been observed that the relatively low total charge density of the polymer composition has beneficial effect on floc size and stability.

According to one embodiment of the invention the polymer composition comprises 0.5-25 weight-%, preferably 2-10 weight-%, more preferably 3-8 weight-% of the first polymer, and 75-99.5 weight-%, preferably 90-98 weight-%, more preferably 92-97 weight-%, of the second polymer. The weight percentages are calculated from the polymer content of the polymer composition (dry/dry).

The polymer composition may preferably be in form of a dry powder or particulate material or particulate product, and it is dissolved into the water and diluted to desired appropriate feed concentration before its use. The obtained polymer composition may be dried and optionally milled to a suitable particle size. According to one embodiment the dry polymer composition in form of particulate product or particulate material or powder may have a solids content of at least 80 weight-%, preferably at least 85 weight-%, more preferably at least 90 weight-%. Dry particulate polymer composition is easy and cost-efficient to transport and store, it remains stable for long periods of time and is resistant towards microbiological degradation.

According to one embodiment the polymer content in the polymer composition is at least 25 weight-%, preferably at least 60 weight-%, more preferably at least 80 weight-%. A polymer composition having lower polymer content, e.g. obtained by dispersion or emulsion polymerisation, has the advantage of easier dissolution. A polymer product having a higher polymer content, e.g. obtained by gel polymerisation, is more cost efficient in view of the logistics of the product. A high polymer content has the additional benefit of improved microbial stability.

According to one preferable embodiment the first polymer may be obtained by solution polymerisation, e.g. by non-radical solution polymerisation. The second polymer may be obtained by gel polymerisation, e.g. by adiabatic gel polymerisation, preferably at acidic pH<6, preferably in a pH range of 2.5-5.5, more preferably 3-4. Said acidic pH is beneficial especially when using hydrolytically unstable cationic monomers in the first and/or the second polymer, thereby reducing hydrolysis of the cationic groups.

According to one embodiment of the invention the polymer composition may have a standard viscosity in the range of 3-6 mPas, preferably 3.6-5.0 mPas, measured at 0.1 weight-% solids content in an aqueous NaCl solution (1 M), at 25° C., using Brookfield DVII T viscometer with UL adapter.

According to one embodiment of the invention the polymer composition may have an intrinsic viscosity in the range of 4-20 dl/g, preferably 7-15 dl/g. The intrinsic viscosity value is obtainable in a known manner by measuring average flow time with an Ubbelohde capillary viscometer (0 C) for a series of dilutions having different polymer content in aqueous $NaNO_3$ solution (0.1 M), at 25° C., calculating a specific viscosity from corrected average flow time, dividing the specific viscosity by the concentration to obtain reduced viscosity for each dilution, plotting reduced viscosity as function of concentration, and reading the Y-axis intercept to give the intrinsic viscosity. It has been observed that the specific intrinsic viscosity range provide the optimal performance for the polymer composition. If the intrinsic viscosity is lower, the flocculation performance may be decreased, and higher intrinsic viscosity value may cause impairment in dissolving time and/or an increased amount of insoluble particles in dry polymer composition.

According to one preferable embodiment of the invention the flocculant comprising the polymer composition is used or added to the aqueous feed in amount of 0.1-10 mg/l, preferably 0.2-3 mg/l, more preferably 0.2-1.0 mg/l, given as dry polymer composition per aqueous feed volume. In another embodiment the polymer composition may be added to the aqueous feed in amount of 1-5 mg/l, given as dry polymer composition per aqueous feed volume. The amount of flocculant comprising polymer composition needed is equivalent or preferably less than dosage amounts for conventional polymer flocculants.

According to one embodiment of the present invention a coagulant may be introduced to the aqueous feed and/or to the dispersion water. The coagulant is preferably introduced before the aqueous feed is brought in contact with the flocculant, i.e. before the introduction of the flocculant. A suitable coagulant may be selected from bentonites, silica sols, polyaluminium chloride, alum, ferric sulphate, ferric chlorite. According to one preferred embodiment the flocculant is added immediately after the addition of the coagulant, for example within about 1 min of the addition of the coagulant. Coagulant interacts with the dissolved substances, optionally also other substances, such as colloidal particles, and forms microflocs. These microflocs may then be flocculated by flocculant.

EXPERIMENTAL

Some embodiments of the invention are described in the following non-limiting examples.

Preparation of Polymer Compositions Used in the Examples

The cationic first polymer was a condensation copolymer of epichlorohydrin and dimethylamine. The amount of cationic first polymer in all final polymer compositions was 6 weight-%, based on dry polymeric material weight of the polymer composition.

The second polymer was copolymer of acrylamide and [2-(acryloyloxy)ethyl] trimethylammonium chloride (ADAM-CI). Before the polymerisation of the second polymer the used monomers, the first polymer, pH adjustment agents (e.g. adipic acid, citric acid), chain transfer agent, chelating agent, redox initiators and thermal initiators in aqueous solutions were degassed with nitrogen. Acrylamide and ADAM-Cl monomers were added to a solution of the first polymer, i.e. host polymer. The mol-% of the used monomers are given in Table 1.

The obtained reaction solution was cooled down at −3° C., a redox initiator added, and free radical polymerisation reaction started. The polymerisation was done in a batch reactor and it was adiabatic. After the polymerisation reaction was finished, the obtained polymer gel was processed with mince meat processor and dried in the oven overnight. After drying the polymer was ground to obtain a powder having a dry content about 90-93 weight-%.

The amount of second polymer in all final polymer compositions was 94 weight-%, based on dry polymeric material weight of the polymer composition.

Reference polymer composition REF-5 was a copolymer of acrylamide (95 mol-%) and ADAM-Cl (5 mol-%), standard viscosity 4.8 mPas, charge density about 0.6 meq/g dry.

The standard viscosities and charge densities of the used polymer compositions are given in Table 1.

TABLE 1

Standard viscosities, intrinsic viscosities and charge densities of the used polymer compositions

| Polymer | Amount Acrylamide [mol-%] | Amount ADAM-Cl [mol-%] | Standard Viscosity [mPas] | Intrinsic Viscosity [dl/g] | Charge Density [meq/g dry] |
| --- | --- | --- | --- | --- | --- |
| C-1.5 | 98.5 | 1.5 | 3.9 | 11 | 0.94 |
| C-3 | 97 | 3 | 4.1 | 10 | 1.15 |
| C-5 | 95 | 5 | 4.2 | 12 | 1.33 |

All polymers were dissolved to 25° C. deionised water at 0.4 weight-% concentration and further diluted to 0.02 weight-% concentration prior to use.

Dissolved Air Flotation Tests

Test apparatus was constructed from pressurised aeration vessel having 0.4 $dm^3$ volume and from Kemira Flocculator mixing unit (Kemira Oyj, Finland) attached to 1000 ml glass beaker. Aeration vessel had valve for filling with water, valve to add pressurised air and valve to empty dispersion water. Aeration vessel bottom was connected with pipe of 3 mm inside diameter to flocculator unit bottom in order to add dispersion water. Pressurised air was adjusted to 4 bar pressure. 60 ml of clear filtrate at 25° C. was added to aeration vessel. Pressurised air was added by opening and closing the valve and aeration vessel was mixed to dissolve air. Air addition and mixing was repeated 3 times to achieve equilibrium in dissolved air amount. 600 ml of cloudy filtrate at 50° C. was added to the beaker.

Sequence of the dissolved air flotation test with flocculator is given in Table 2.

TABLE 2

Procedure for dissolved air flotation test

| Time | Action |
| --- | --- |
| −20 s | Cloudy filtrate addition to beaker, Flocculator started with 300 rpm |
| −10 s | Polymer feeding |
| −10 . . . 0 s | Dispersion water feed by opening valve from aeration vessel |
| 0 s | Flocculator speed changed to 20 rpm |
| 0 . . . 100 s | Rising time determination visually, time recorded when 90% flocks have arrived to surface |
| 75 s | Measurement of surface sludge layer thickness with ruler |

TABLE 2-continued

Procedure for dissolved air flotation test

| Time | Action |
| --- | --- |
| 90 ... 120 s | Filtrate sampling with 100 ml glass pipette two times from 300 ml beaker height |
| 120 s | Stop of the flocculator mixing |
| 150 s | Filtrate turbidity measurement |

Suspended solids measurement for the filtrate was done by using tared white ribbon Munktell filter paper in Bühner vacuum funnel. 200 ml of filtrate was filtered.

Filter papers with the filtration pad were dried in 110° C. for 4 hours, cooled in exicator and weighted.

Other Apparatuses and Methods

Other apparatuses and methods used in the following examples are given in Table 3.

TABLE 3

Characterisation of apparatuses and methods used in the examples.

| Property | Apparatus/Standard |
| --- | --- |
| pH | Knick Portamess 911 pH |
| Cationic Demand | Mütek Particle Charge Detector |
| Conductivity | Knick Portamess 911 Cond |
| Suspended solids | SFS 3008 |
| Ash (525° C.) | ISO 1762 |
| Turbidity | HACH 2100AN IS Turbidimeter// ISO 7027 |

Example 1

Water samples, which were treated, were obtained from a second loop of old newsprint deinking process.

The deinking plant second loop disc filter cloudy filtrate, used for feed, had following characteristics:

500 mg/l of suspended solids, pH 7.5, ash content 55%, conductivity 2 mS/cm, cationic demand 300 µeq/l.

Used dispersion water had following characteristics: 150 mg/l of suspended solids, pH 7.5, ash content 55%, conductivity 2 mS/cm, cationic demand 300 µeq/l.

The results in Table 4 show that the use of the flocculants comprising polymer compositions enable faster flock rising time, lower filtrate turbidity and lower suspended solids in the clear filtrate in comparison with the reference composition, at corresponding dosage, given as ppm (solid polymer to feed flow). Alternatively, it is possible to achieve a good performance by using a lower dosage of polymer composition. An additional benefit may be increased feed capacity of the dissolved gas flotation unit, as a result of a faster rising time.

TABLE 4

Dissolved air flotation test program and results.

| Test # | Polymer dosage added at −10 s [ppm] | | | | Rising time [s] | Turbidity [NTU] | Suspended solids [mg/l] |
| --- | --- | --- | --- | --- | --- | --- | --- |
| | C-3 | REF-5 | C-1.5 | C-5 | | | |
| 0 | 0 | 0 | 0 | 0 | 100 | 1520 | 390 |
| 1 | 2 | — | — | — | 28 | 580 | 120 |
| 2 | 1 | — | — | — | — | 700 | 94 |
| 3 | 0.5 | — | — | — | — | 930 | 200 |
| 4 | 0.3 | — | — | — | — | 980 | 170 |
| 9 | — | 2 | — | — | 34 | 800 | 120 |
| 10 | — | 1 | — | — | — | 1020 | 170 |
| 11 | — | 0.5 | — | — | — | 1180 | 270 |
| 13 | — | — | 2 | — | 14 | 460 | 38 |
| 14 | — | — | 1 | — | — | 590 | 41 |
| 15 | — | — | 0.5 | — | — | 700 | 43 |
| 16 | — | — | 0.3 | — | — | 783 | 58 |
| 17 | — | — | — | 2 | 26 | 740 | 120 |
| 18 | — | — | — | 1 | — | 900 | 150 |
| 19 | — | — | — | 0.5 | — | 1070 | 190 |

Example 2

Water samples, which were treated, were obtained from a first loop of tissue washing deinking process for mixed office waste.

The washer filtrate, used for feed, had following characteristics: 1950 mg/l of suspended solids, pH 7.7, ash content 34%, conductivity 0.64 mS/cm, cationic demand 250 µeq/l.

Used dispersion water had following characteristics:

50 mg/l of suspended solids, pH 7.5, ash content 15%, conductivity 0.62 mS/cm, cationic demand 250 µeq/l.

The results in Table 5 show that the use of the flocculants comprising polymer compositions according to invention enable faster flock rising time, lower filtrate turbidity and lower suspended solids in the clear filtrate in comparison with the reference composition, at corresponding dosage, given as ppm (solid polymer to feed flow). Alternatively, it is possible to achieve a good performance by using a lower dosage of polymer composition. An additional benefit may be increased feed capacity of the dissolved gas flotation unit, as a result of a faster rising time. Further, a reduction in thickness of the surface sludge thickness indicates that the surface sludge can be separated at higher consistency, which is beneficial for the successive sludge treatment steps.

TABLE 5

Dissolved air flotation test program and results.

| Test # | Polymer dosage added at −10 s [ppm] | | | | Sludge thickness [mm] | Rising time [s] | Turbidity [NTU] | Suspended solids [mg/l] |
| --- | --- | --- | --- | --- | --- | --- | --- | --- |
| | REF-5 | C-1.5 | C-3 | C-5 | | | | |
| 2-0 | 0 | — | — | — | 19 | 90 | 650 | 310 |
| 2-1 | 2 | — | — | — | 14 | 45 | 230 | 80 |
| 2-2 | 1 | — | — | — | 14 | 50 | 230 | 110 |
| 2-3 | 0.3 | — | — | — | 18 | 60 | 350 | 130 |
| 2-4 | — | 2 | — | — | 10 | 15 | 110 | 30 |
| 2-5 | — | 1 | — | — | 11 | 26 | 100 | 30 |

TABLE 5-continued

Dissolved air flotation test program and results.

| Test # | Polymer dosage added at −10 s [ppm] | | | | Sludge thickness [mm] | Rising time [s] | Turbidity [NTU] | Suspended solids [mg/l] |
|---|---|---|---|---|---|---|---|---|
| | REF-5 | C-1.5 | C-3 | C-5 | | | | |
| 2-6 | — | 0.3 | — | — | 15 | 38 | 130 | 22 |
| 2-7 | — | — | 2 | — | 11 | 25 | 91 | 3 |
| 2-8 | — | — | 1 | — | 16 | 37 | 110 | 6 |
| 2-9 | — | — | 0.3 | — | 17 | 43 | 160 | 36 |
| 2-10 | — | — | — | 2 | 11 | 20 | 100 | 14 |
| 2-11 | — | — | — | 1 | 14 | 32 | 120 | 28 |
| 2-12 | — | — | — | 0.3 | 16 | 35 | 210 | 84 |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for treating an aqueous feed by dissolved gas flotation, the aqueous feed originating from an industrial processing of fibrous material of cellulosic origin, wherein the aqueous feed comprises an aqueous phase and a solid particulate material suspended in the aqueous phase, wherein the method comprises:
bringing a flocculant in contact with the aqueous feed and flocculating the suspended solid particulate material into flocs through interaction of the flocculant and the suspended solid particulate material,
contacting formed flocs with gas bubbles and inducing their flotation in a flotation basin,
wherein
the flocculant, which is used for flocculating the suspended solid particulate material, comprises a polymer composition having a charge density of at most 1.7 meq/g dry, and the polymer composition comprises: comprising:
a cationic synthetic first polymer, which has a charge density of at least 1.0 meq/g dry at pH 2.8,
at least one cationic second polymer, which is a polymer obtained by polymerization of (meth)acrylamide and at least one cationic second monomer in presence of the cationic first polymer, an amount of the second monomer being 0.2-19 weight-%, calculated from total dry polymeric material weight of the polymer composition, and
wherein the cationic synthetic first polymer has a higher charge density than the at least one second cationic polymer.

2. The method according to claim 1, wherein the cationic synthetic first polymer has charge density in a range of 1-12 meq/g dry, at pH 2.8.

3. The method according to claim 1, wherein the cationic synthetic first polymer is selected from polyamines; homopolymers of cationic first monomer, obtained by radical polymerization; copolymers of acrylamide and a cationic first monomer, obtained by radical polymerization; or any combinations thereof.

4. The method according to claim 3, wherein the cationic synthetic first polymer is polyamine selected from copolymers of epichlorohydrin and dimethylamine, copolymers of epichlorohydrin, dimethylamine and ethylenediamine, and linear or cross-linked polyamidoamines.

5. The method according to claim 3, wherein the cationic synthetic first polymer is a homopolymer of cationic first monomer selected from group consisting of 2-(dimethylamino)ethyl acrylate (ADAM), [2-(acryloyloxy)ethyl] trimethylammonium chloride (ADAM-Cl), 2-(dimethylamino) ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethyl-ammonium chloride (DADMAC).

6. The method according to claim 1, wherein the polymer composition comprises cationic synthetic first polymer in amount of 0.5-35 weight-%, calculated from the dry polymeric material weight of the polymer composition.

7. The method according to claim 1, wherein the cationic first polymer has a weight average molecular weight MW<500 000 g/mol.

8. The method according to claim 1, wherein the second polymer is cationic and the second monomer is selected from group consisting of 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethyl-ammonium chloride (DADMAC).

9. The method according to claim 1, wherein the second polymer is obtained by using adiabatic gel polymerization.

10. The method according to claim 1, wherein the polymer composition has a standard viscosity in a range of 3-6 mPas.

11. The method according to claim 1, wherein the polymer composition has an intrinsic viscosity in a range of 4- 20 dl/g.

12. The method according to claim 1, wherein the aqueous feed comprises suspended solid particulate material in total amount of less than 6000 mg/l.

13. The method according to claim 1, wherein the aqueous feed has a conductivity in a range of 0.2-10 mS/cm.

14. The method according to claim 1, wherein the aqueous feed has a cationic demand value in a range of 20-3000 µeq/l.

15. The method according to claim 1, wherein the pH of the aqueous feed is in a range of 4-9.5.

16. The method according to claim 1, wherein the suspended solid particulate material comprises inorganic mineral particles and cellulosic fibres and/or fibrils.

17. The method according to claim 1, wherein the flocculant comprising the polymer composition is used in amount of 0.1-10 mg/l, given as dry polymer composition per aqueous feed volume.

18. The method according to claim 1, wherein a coagulant is introduced to the aqueous feed before the aqueous feed is brought in contact with the flocculant.

\* \* \* \* \*